United States Patent [19]
Kobayashi et al.

[11] 3,898,000
[45] Aug. 5, 1975

[54] SHUTTER ARRANGEMENT FOR A MOTION PICTURE CAMERA

[75] Inventors: Katsumi Kobayashi; Nobuaki Enomoto, both of Tokyo, Japan

[73] Assignee: Kabushiki Kaisha Yashica, Tokyo, Japan

[22] Filed: Dec. 20, 1973

[21] Appl. No.: 426,585

[30] Foreign Application Priority Data
Dec. 25, 1972  Japan.............................. 47-129423
Mar. 31, 1973  Japan.............................. 48-39385

[52] U.S. Cl. ............... 352/169; 352/121; 352/137; 352/141
[51] Int. Cl. .......................................... G03b 21/38
[58] Field of Search ........... 352/169, 121, 137, 141

[56] References Cited
UNITED STATES PATENTS
3,603,678  9/1971  Anderl................. 352/169
3,705,764  12/1972  Reinsch................. 352/169 X
3,753,613  8/1973  Reinsch................. 352/169 X
3,767,298  10/1973  Reinsch................. 352/169
3,787,116  1/1974  Shimizu................. 352/141

*Primary Examiner*—Monroe H. Hayes
*Attorney, Agent, or Firm*—Christie, Parker & Hale

[57] ABSTRACT

A motion picture camera has a shutter arrangement that provides for exposing each frame of film for a sub-interval of time during a portion of which a rotatable shutter blade is stationary. Circuit means provide an oscillating signal that defines the sub-interval of time during each period of oscillation. Means are provided for adjusting the duration of the sub-interval of time so that for relatively low light level conditions the exposure time per frame can be increased.

7 Claims, 9 Drawing Figures

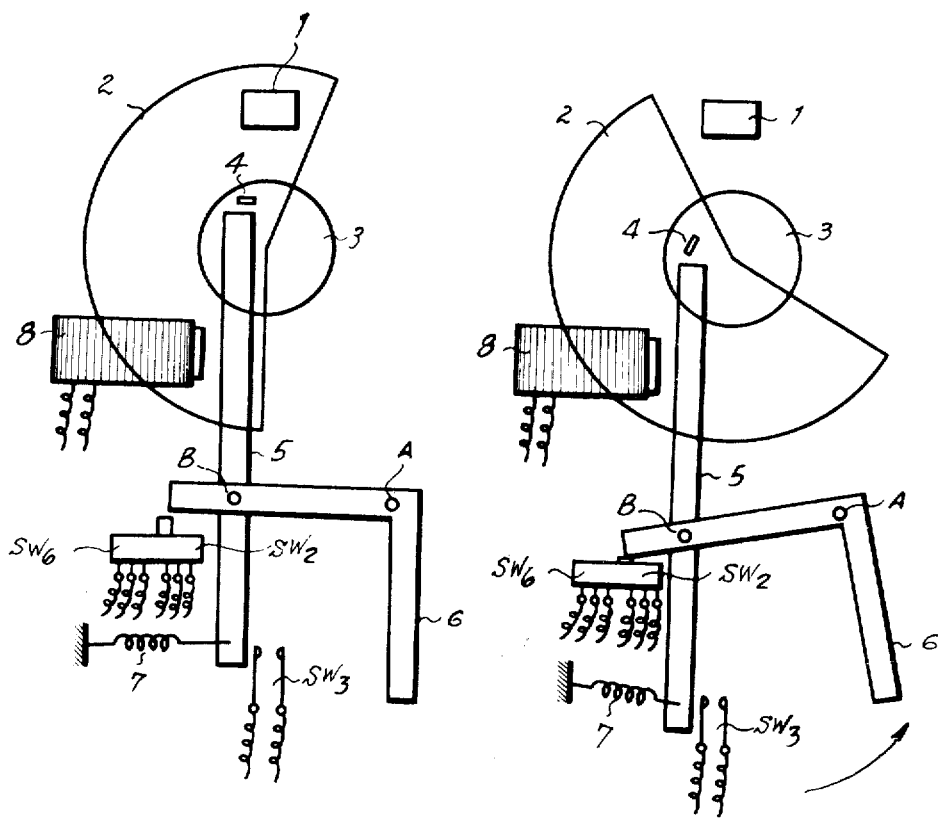

3,898,000

SHUTTER ARRANGEMENT FOR A MOTION PICTURE CAMERA

BACKGROUND OF THE INVENTION

This invention relates to motion picture cameras.

In the typical motion picture cameras of the type used for making home movies, in contrast to more sophisticated high-speed photographic instruments, the exposure time per frame of film varies with a change in frame speed. Ordinarily, such cameras operate in a selected one of two frame speeds. A frame speed of about 36 frames per second is used typically to achieve slow-motion effects when the film is later projected at the conventional frame speed of 18 frames per second.

To achieve exposure control the typical approach is to adjust the lens diaphragm opening (i.e., $f$ number) in accordance with the various exposure factors such as film sensitivity (i.e., ASA number), light intensity and the like. It has not been the practice, however, to vary the per frame exposure time. Accordingly in circumstances where the diaphragm is fully opened and yet insufficient light is available for proper exposure at the fixed exposure time, such cameras cannot be used.

SUMMARY OF THE INVENTION

This invention is directed to a motion picture camera shutter arrangement that is particularly adapted to relatively low light level photography.

In accordance with this invention, a motion picture camera is provided with a film aperture. A blade serves as a shutter for the film aperture. The blade is rotatable so as to define open shutter and closed shutter positions. To control the rotary movement of the blade there are provided a controllable drive mechanism and a controllable stop mechanism. Advantageously, the stop mechanism includes a projection on the blade and a pivotable arresting lever that engage each other so as to stop the blade. In the preferred embodiment, an electromagnet is energized so as to attract the end of the arresting lever thereby forcing it to pivot thereby releasing the blade, and, incident to this pivoting, a switch is closed to provide energization current to an electric motor in the drive mechanism.

Significantly, circuit means are provided for generating an oscillating signal the frequency of which defines the camera frame rate. This oscillating signal defines first and second sub-intervals during each period of oscillation. The circuit means is operable in either a first mode of operation in which the frame rate is substantially constant or a second mode of operation in which the frame rate varies to provide shutter speed control of exposure. Means, preferably comprising the above-described electromagnet and switch, respond to the circuit means to control the drive mechanism and the stop mechanism so that during the first sub-interval the stop mechanism releases the blade and thereafter the drive mechanism provides torque to rotate the blade, and, during the second sub-interval, the blade coasts until its rotation is stopped by the stop mechanism. The stop mechanism is preferably arranged to arrest the coasting motion of the blade at one of two selectable positions, one position being selected for normal photographing conditions where exposure control is effected by diaphragm adjustment (i.e., aperture size control of exposure by means of a servomechanism) and the other position being selected for relatively low light conditions. In such low light conditions, the stop mechanism so arrests the rotation of the blade at an open shutter position. Owing to a preferred feature which involves a manually adjustable timing network, the frame rate of the camera can be adjusted to a relatively slow substantially constant frame rate such as five frames per second for use in low light level conditions, and any necessary exposure adjustments are effected by the servomechanism. The circuit means includes a controllable switch, first and second timing networks selected by the controllable switch for timing means for adjusting the duration of the second sub-interval in the first and second modes of operation respectively. The second timing network includes a photoconductor for adjusting the timing of the second timing network in accordance with object light so as to provide an adjustable exposure time. A particularly advantageous feature relates to an automatic change-over from aperture size control of exposure to shutter speed control of exposure.

BRIEF DESCRIPTION OF THE DRAWINGS

FIGS. 8 and 9 are schematic views of mechanical portions of the second embodiment.

Figures 1, 2:
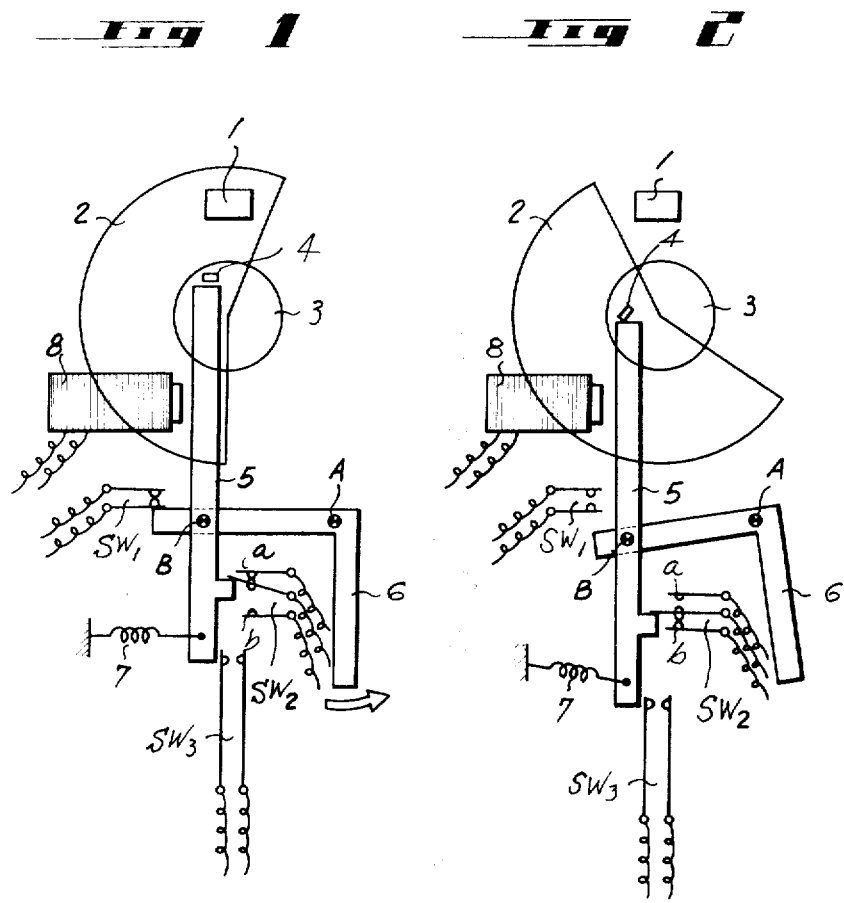
FIG. 1 is a schematic view of the main mechanical portion of a motion picture shutter arrangement according to a first embodiment of this invention.
FIG. 2 is a view showing the same mechanical portion as shown in FIG. 1 but illustrating it in a condition in which exposure control is effected through controlling exposure time.

As schematically shown in FIG. 1, there is arranged in front of a film aperture 1 in a well known manner a shutter blade 2. The shutter blade is rotatable on a shaft 3. A cut out section of the blade when positioned in front of the film aperture permits light to pass therethrough; otherwise, the blade covers the aperture. Thus, depending upon the position or angle to which it has been rotated, the blade defines either an open (or at least partly open) shutter or a closed shutter.

The blade 2 carries a projection 4 that moves in a circular path as the blade rotates. In this circular path there is positioned an upper end of an arrester lever 5 which is pivoted at B. A spring 7 provides bias force against the lower end of the arresting lever thereby to urge it to a return position. An electromagnet 8 is energizable to attract the upper end of the arrester lever thereby forcing it to pivot away from the return position. Once it is so pivoted out of the return position, the arrester lever 5 disengages from the projection 4 thereby releasing the blade for rotation.

As will be discussed in more detail below, the blade, after it is released, is rotatably driven, and, after driving torque is removed, coasts until it is stopped by virtue of the engagement of the projection 4 and the arrester lever 5. What has so far been described is conventional in the art. That is, prior art motion picture cameras have included a controllable stop mechanism such as the engageable arrester lever and projection, and means for controlling it such as the electromagnet and return spring. However, in a distinguishing feature, the stop mechanism is preferably arranged to arrest the coasting motion of the blade at one of two selectable positions. One of these positions is selected for normal photographing conditions where exposure control is effected by diaphragm adjustment. The other of these positions is selected for relatively low light conditions.

To this end, there is provided a selector lever 6 which is operable externally. One end of the selector lever 6 is coupled to the pivot shaft B. The selector lever 6 is pivotable about a pivot A whereby the arrester lever 5 can be moved up (as shown in FIG. 1) or down (as shown in FIG. 2). For normal photographing conditions, the arrester lever 5 is positioned as shown in FIG. 1 whereby the blade has a stop position covering the aperture 1. For low light conditions, on the other hand, the arrester lever 5 is positioned as shown in FIG. 2 whereby the blade has a stop position exposing the aperture.

A first electric switch $SW_1$ is arranged so that it maintains a closed state when the arrester lever 5 is in the normal photographing position as seen in FIG. 1 and opens upon displacement of the arrester lever 5. A second switch $SW_2$ is arranged in such a manner that it keeps the terminal $a$ closed in the normal position of the arrester lever 5 and switches to the terminal $b$ when the arrester lever 5 is displaced. A third switch $SW_3$ is so arranged that it is closed by the pivoting movement of the arrester lever 5 incident to the energization of the electromagnet 8.

Figure 3:
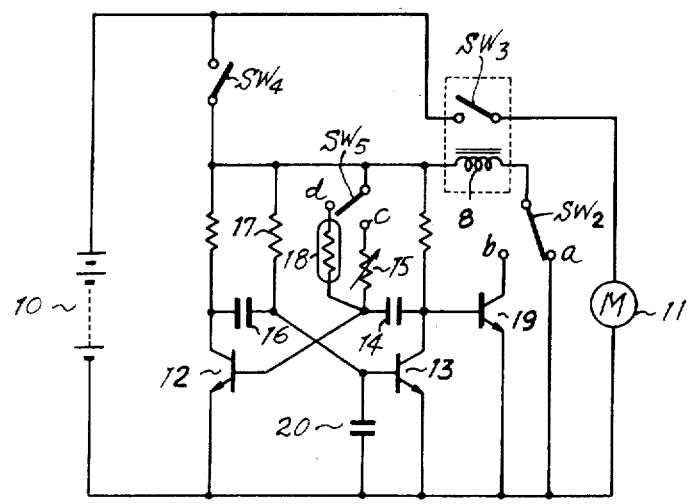
FIG. 3 is a schematic diagram of circuitry included in the first embodiment.

In FIG. 3, there is shown a battery 10 that, among other things, switchably provides power to a motor 11 that is part of the drive mechanism for the blade. In accordance with conventional practice the same motor 11 also drives the film transport mechanism (not shown) that advances the film for frame at a time exposure. The third switch $SW_3$ is connected in series between the battery 10 and the motor 11 so as to provide switching control over the drive mechanism.

The electromagnet 8 is connected in a series circuit comprising a photographing release switch $SW_1$ and the terminal $a$ of the second switch $SW_2$.

FIG. 3 further shows a self-running multivibrator means which is powered by the battery 10 upon closure of the release switch $SW_4$. The multivibrator includes transistors 12 and 13 which are cross-coupled so that while one is forward biased and conducting the other is reverse biased and non-conducting. A capacitor 14 cross couples the collector of transistor 13 to the base of transistor 12, and a capacitor 16 cross couples the collector of transistor 12 to the base of transistor 13. The capacitor 16 is connected to a resistor 17 to form a network whose RC time constant determines the duration within a cycle of the sub-interval of time during which transistor 13 is reverse-biased. The capacitor 14 is connected to resistive elements 15 and 18, selected one of which forms a network whose RC time constant determines the duration within a cycle of the sub-interval of time during which transistor 12 is reverse biased.

A selector switch $SW_5$ provides for selecting as between the resistive elments 15 and 18. When its terminal $c$ is closed resistive element 15 forms the network with capacitor 14. On the other hand, when the selector switch $SW_5$ is closed at terminal $d$, the resistive element 18 which is a light sensitive element such as a photoconductor adapted to receive the light from the object, is inserted in the circuit in place of the resistor 15. The resistive element 15 may be a variable resistor which can be operated externally so that the reverse operation intervals of said multivibrator can be adjusted manually.

Figure 4:
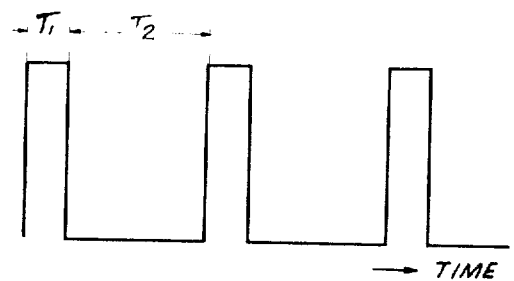
FIG. 4 is a timing diagram illustrating sub-intervals of time with a period of oscillation of oscillating circuitry shown in FIG. 3.

A capacitor 20 is connected across the base and emitter terminals of the transistor 13. The capacitor 20 ensures that the transistor 13 is maintained in a non-conductive condition when the multivibrator starts operation; thus, at this time, the transistor 12 initially conducts. As schematically shown in FIG. 4, in the operation of the multivibrator, the transistor 13 has a non-conducting time $T_1$, while the transistor 12 has a non-conducting time (or conducting time of the transistor 13) $T_2$. The above-described and illustrated circuit arrangement may be replaced by any suitable saw-tooth wave generator or other oscillator circuit which develops an output wave form as shown in FIG. 5 or 6 and is capable of being varied in its signal period (i.e., the sub-interval of time $T_2$) either manually or automatically in response to a light sensitive element.

Figure 5:
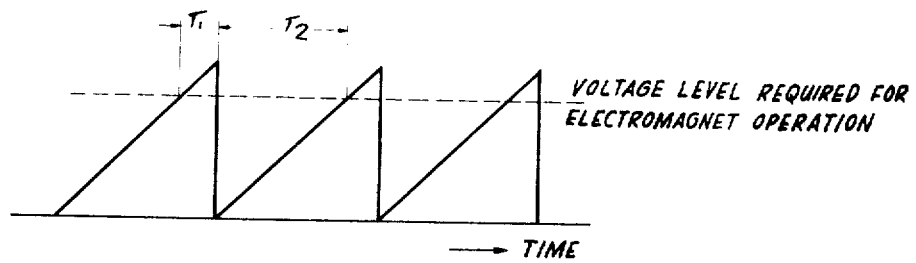
FIGS. 5 and 6 are wave form diagrams of signals that are suitable for defining the sub-intervals of time illustrated in FIG. 4.
Figure 6:
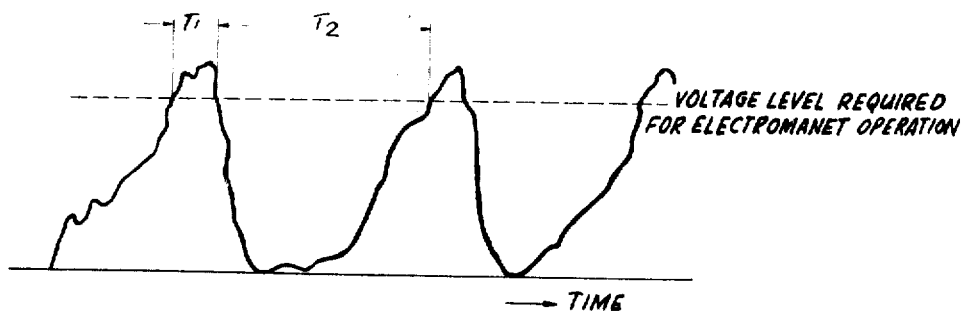

Referring to the characteristic curves illustrated in FIGS. 5 and 6, the time $T_1$ means the time duration where the voltage is high enough so that each of these wave forms can be applied to the electromagnet 8 for energizing the same.

A transistor 19 is a power transistor which performs a switching operation upon receipt of an output signal from said multivibrator at its base terminal to thereby control the power supply to the electromagnet 8 under closure of terminal $b$ of said selector switch $SW_2$.

With the shutter device of the above-described construction the mechanical section thereof is initially, for a normal photographing operation, in the position shown in FIG. 1. More specifically, the selector lever 6 is in the shown normal position where the arrester lever 5 arrests the shutter blade 2 in the position to cover the film aperture 1. Under these conditions when the release switch $SW_4$ (FIG. 3) is closed, the terminal $a$ of the switch $SW_2$ is closed and the electromagnet 8 is energized to thereby attract the arrester lever 5, pivoting it at B counter-clockwise as viewed in FIG. 1. This disengages the tip of the arrester lever 5 from the projection 4 so that the arrester lever 5 is now in a freely pivotable state. At the same time the arrester lever 5 closes the switch $SW_3$ with its other end, so that the power supply to the motor 11 is initiated to thereby start a normal photographing operation.

To interrupt photographing, when the release switch $SW_4$ is opened the electromagnet 8 and motor 11 are de-energized. At this time first the arrester lever 5 returns into the circular path of the projection 4 by the action of the spring 7 and, owing to the interruption of the driving force from the motor 11, turns by inertia until the forward end thereof is engaged with the projection 4.

During such a normal photographing operation a known automatic exposure control mechanism keeps operating under closure of the switch $SW_1$ to thereby allow a photographing with an optimum exposure. Under these circumstances the self-running multivibrator (FIG. 3) produces its oscillating signal, but inasmuch as the switch $SW_2$ is closed to terminal $a$, the signal has no influence over the photographing operation.

When it is intended to carry out photographing with a long exposure duration, the selector lever 6 is pivoted on the fulcrum A in the direction of arrow (FIG. 1). This lowers the arrester lever 5 to the position shown in FIG. 2 and hence the switch $SW_1$ opens to make the automatic exposure control circuit inoperative and the switch $SW_2$ is closed at its terminal $b$. When the arrester lever 5 is in its lowered position the shutter blade 2 is arrested at the position shown in FIG. 2 with the film aperture uncovered to permit the photographing light incoming therethrough. At this time the camera mechanism, being in the state unable to be controlled automatically due to opening of the switch $SW_1$, is in the maximum diaphragm aperture position, provided that the camera mechanism includes an automatic diaphragm control.

Upon closure of the release switch $SW_4$, the transistor 13, being initially in a non-conducting state (the state in the time interval $T_1$), thereafter starts conducting. With transistor 13 non-conducting, the energization of the electromagnet 8 during the time interval $T_1$ starts under control of the transistor 19. When the electromagnet 8 is energized the camera mechanism starts operation in the same manner as in the above-discussed normal photographing. In this event, however, the electromagnet 8 is energized only during a short period of time $T_1$ so that it releases the arrester lever 5 soon after the same has been attracted. After releasing the projection 4 the arrester lever 5 restores into the projection arresting area, after the projection 4 has been moved away to the position out of the action area of the arrester lever 5. The restoration of the arrester lever 5 opens the switch $SW_3$, thereby terminating the energization of the motor 11.

Even after the motor 11 has been de-energized the shutter blade 2, owing to its inertia, keeps rotating or coasts until the projection 4 engages with the forward end of the arrester lever 5. As mentioned previously, at its stop position the shutter blade 2 uncovers the film aperture 1 to permit the photographing light incoming through the film aperture 1. Consequently, the film exposure is maintained even during the time when the shutter blade 2 is stopped. This means that in this photographing operation a film frame is exposed continuously over a time period starting at the moment when the shutter blade 2 is stopped and ending at the moment when the shutter blade 2 has been rotated over a predetermined angle to cover the film aperture 1 again.

An optimum exposure can be obtained if the circuit is so designed, taking into consideration the time interval (this is always constant) required for the cut-off portion of the shutter blade 2 to run through, that the sub-interval of time $T_2$ is varied in response to the intensity of the object light sensed by the light sensitive element 18. By repeating the foregoing operations any intended photographing operations may be suitably achieved. It is also possible to take pictures with a manually preset exposure time by operating the switch $SW_5$ to manually adjust the resistance value of the resistor 15.

It will be appreciated from the foregoing description that according to the shutter device of this invention the stop position of the shutter blade can be set externally to the position where the light is allowed to come into the film aperture. The automatic control of the stop time interval for the shutter blade by means of an electric circuit permits to extend the adjustable range of the exposure time, so that the photographing operation by use of a low sensitivity film or under low illumination conditions becomes possible by controlling the exposure time.

Figure 7:
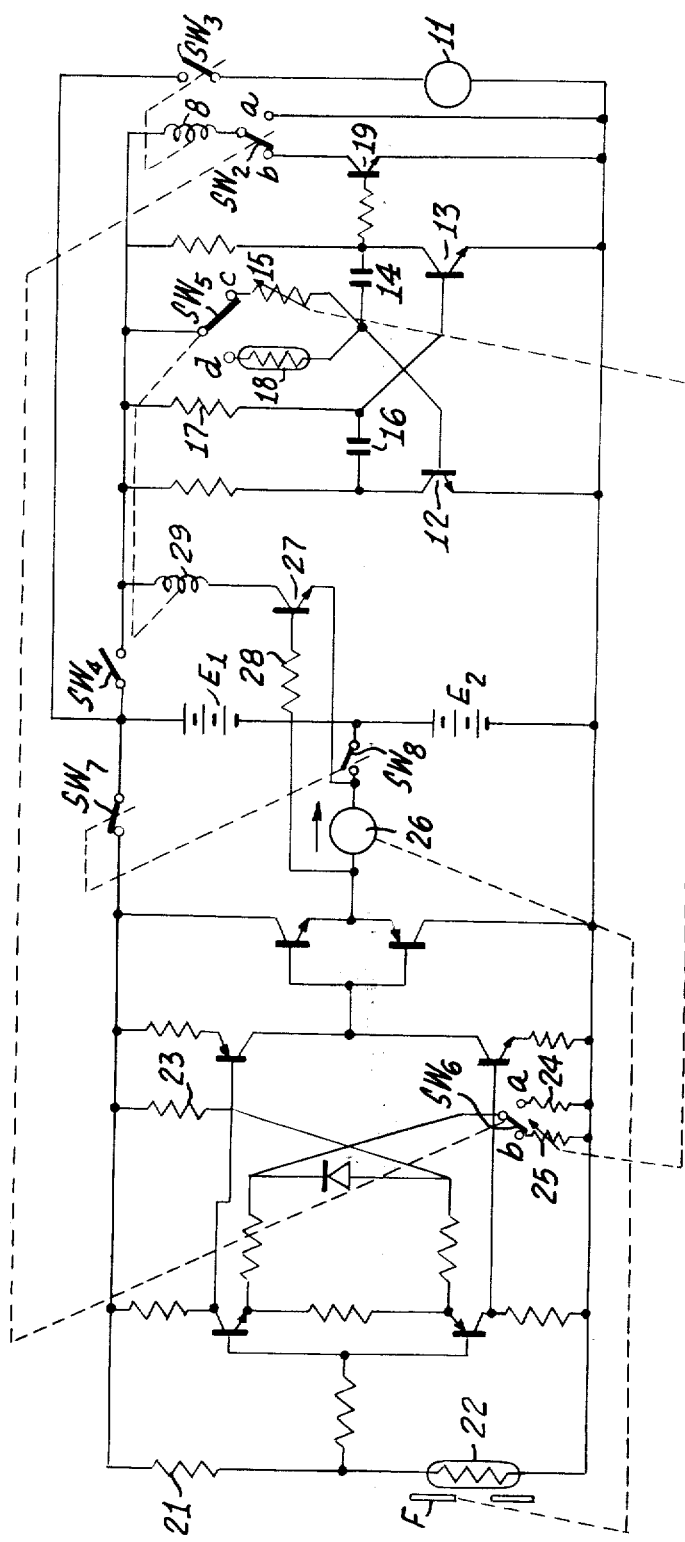
FIG. 7 is a schematic diagram according to a second embodiment of this invention.

The above-described shutter device may be operated in association with a diaphragm aperture control device. FIGS. 7–9 illustrate by way of example how the shutter device of this invention can be associated with a diaphragm aperture control device. In these Figures the parts and components corresponding to those included in FIGS. 1–3 are designated by like reference numerals. First, reference should be made to FIG. 7, wherein a resistor 21 and a light detection element 22 made of a photoconductor are serially connected to power batteries $E_1$ and $E_2$ through a switch $SW_7$. Said resistor 21 and light detection element 22 form a bridge circuit together with resistors 23 and 24. To an end of the resistor 24 is connected a selector switch $SW_6$ which is operative in association with the selector switch $SW_2$ so that the selector switch $SW_6$ can be switched over from the fixed resistor 24 to a variable resistor 25 associated with a variable resistor 15. The output of said bridge circuit is connected to one terminal of a servomotor 26 for operating the diaphragm F by way of a differential voltage amplifier circuit composed of transistors. The other terminal of the servomotor 26 is connected to the connecting point between the power batteries $E_1$ and $E_2$ over a switch $SW_8$ which is associated with a switch $SW_7$. A transistor 27 is connected at emitter to the connecting point between the switch $SW_8$ and servomotor 26, at base to the other terminal of the servomotor 26 over a resistor 28, and at collector to the connecting point between the switch $SW_4$ and electromagnet 8 over an electromagnet 29 adapted to control the operation of a controllable selector switch $SW_5$.

FIGS. 8 and 9 illustrate the main mechanical portion of this embodiment. The illustrated arrangement is almost similar to that of FIGS. 1 and 2 except that, in addition to the switch $SW_2$, the switch $SW_6$ is arranged in such a manner that it operates in association with the arrester lever 5. At the normal photographing position of the arrester lever 5 said switches $SW_2$ and $SW_6$ are closed at terminals $a$ respectively, while they are closed at terminals $b$ upon displacement of the arrester lever 5.

Now the operation of the foregoing arrangement will be discussed. During a normal photographing operation the switches $SW_7$ and $SW_8$ are in closed position and the switches $SW_2$ and $SW_6$ are closed at the terminals $a$ respectively so that the associating mechanical parts are in the position shown in FIG. 8. When the release switch $SW_4$ is closed to energize the electromagnet 8, the latter attracts one end of the arrester lever 5 so that the arrester lever 5 pivots at B counterclockwise (as viewed in FIGS. 8 and 9) against the action of the urging spring. The switch $SW_3$ is closed when engaged by one end of the arrester lever 5. On the other hand, upon the projection 4 being released from the arrester lever 5 the driving motor 11 starts rotation, thereby initiating a normal photographing operation. To interrupt the photographing operation the switch $SW_4$ is opened to energize the electromagnet 8 and hence the switch $SW_3$ is opened to stop the driving motor 11.

If the resistance values of the resistor 21, light detection element 22 and resistors 23 and 24 are expressed by $r_4$, $r_5$, $r_6$ and $r_7$ respectively, then these elements are balanced when a relation of $r_4 \, r_7 = r_5 r_6$ is satisfied. Under these conditions the servomotor 26 stops to determine the aperture of the diaphragm F arranged in front of the light detection element 22.

For a long exposure time photographing, the selector lever 6 is pivoted on the point A in the direction of arrow as shown in FIG. 9 to thereby lower the arrester lever 5. As a result, the shutter blade 2 rotates to the position where it does not cover the film aperture 1. At the same time the switches $SW_2$ and $SW_6$ are pressed by the end of the selector lever 6 to be switched from the terminals $a$ to $b$. In this manner the electromagnet 8 is energized at intervals determined by the time constant of the variable resistor 15 and capacitor 14 and the time constant of the resistor 17 and capacitor 16, thereby repeating the on-off operation of the switch $SW_3$ to energize and de-energize the drive motor 11. In this case during the time interval determined by the time constant of the variable resistor 15 and capacitor 14, the transistor 13 remains non-conducting, thereby de-energizing the electromagnet 8 and hence not pivoting the arrester lever 5. The switch $SW_3$, therefore, opens as shown in FIG. 9 to stop the drive motor 11, and the shutter blade 2, after having been rotated over a predetermined angle, stops at a position where it uncovers the film aperture 1 for exposure.

During the succeeding time interval determined by the time constant of the resistor 17 and capacitor 16 the transistor 13 becomes conductive to energize the electromagnet 8, so that the arrester lever 5 is attracted by the electromagnet 8, pivoting on the point B counter-clockwise until an end thereof engages with the switch $SW_3$ to thereby close the same. Since the arrester lever 5 is retracted out of the passage of the projection 4 the drive motor 11 is allowed to rotate. The time interval determined by the time constant of the resistor 15 and capacitor 14 may be preset to be shorter than the time required for exposing a single frame in a normal photographing (18 frame/sec.).

Assuming that the time interval determined by the time constant of the variable resistor 15 and capacitor 14 is 0.2 sec (5 frame/sec.), then the exposure time will be determined by $r_4r_8=r_5r_6$ (that is, the product of the resistance values of the opposing resistors included in the bridge circuit) because of the switching operation of the $SW_6$ from the resistor 24 to 25 (resistance value $r_8$). Provided that the resistance of the resistor 21 is so preselected as to represent the film sensitivity information, the resistor 22 as to represent the light intensity, resistor 23 as to represent the frame number information and the resistor 24 as to have a value with which the optimum exposure can be attained in a normal photographing operation (for example, 18 frame/sec.), then the variable resistor 25 may be selected to have a resistance range covering the EV difference between the 18 frame/sec. and 5 frame/sec. operations. Therefore, an optimum exposure can be attained by the diaphragm control under a low illumination condition, even when the exposure is set to 5 frame/sec. by the time constant of the adjusted variable resistor 15 and capacitor 14.

It was impossible with a conventional small-sized motion picture camera to proceed with photographing when the intensity of the object light lowers below a certain limit at which the aperture of the diaphragm F is full opened, because film is under-exposed below such a limit. When the diaphragm is full opened and the diaphragm blade engages with a stopper on the open side, the shutter device of this invention operates in the following manner:

As soon as the intensity of the object light lowers below said limit level the relation of $r_4r_8=r_5r_6$, or the condition for balancing the bridge circuit is not satisfied any more. When the bridge circuit becomes unbalanced, an amplified current flows through the servomotor 26 in the direction of arrow, thereby developing a potential difference across the terminals of the servomotor 26. This potential difference is detected by the transistor 27 in that the potential difference biases the transistor 27 across the base and emitter terminals thereof to make it conductive. As a result the electromagnet 29 is energized to switch over the selector switch $SW_5$ from the terminal $c$ to $d$ so that the time interval is determined, in this case, by the time constant of the light detection element 18 and the capacitor 16. The resistance of the light detection element 18 which varies with the intensity of the object light is used to control the time interval. This enables a long time exposure and hence a low illumination photographing is made possible. More specifically, if the variable resistor 15 is set so that it has a resistance equal to that of the light detection element 18 under a low illumination condition where the diaphragm is full opened, then it may be possible to perform a photographing operation over a wider illumination range, including normal outdoor and indoor photographing operations and very-low illumination photographing operations.

It will be appreciated from the foregoing that with the shutter device of this invention, which comprises means for regulating the shutter blade stop position, a timer means associated with said shutter blade stop position regulating means and means for adjusting the diaphragm value, the diaphragm control is effected prior to the shutter speed control in a very-low illumination photographing. This means that the shutter device of this invention makes it possible to take pictures under low illumination conditions, which cannot be attained with prior art cameras.

What is claimed is:

1. In a motion picture camera, the combination comprising:
    a film aperture;
    a blade serving as a shutter for the film aperture, the blade being rotatable so as to define open shutter and closed shutter positions;
    a controllable drive mechanism for the blade;
    a controllable stop mechanism for the blade;
    circuit means for generating an oscillating signal the frequency of which defines the camera frame rate, the circuit means being operable in either a first mode of operation in which the frame rate is substantially constant or a second mode of operation in which the frame rate varies to provide shutter speed control of exposure, the oscillating signal defining first and second sub-intervals during each period of oscillation;
    a diaphragm;
    a servomechanism for adjusting the aperture size of the diaphragm when the circuit means operates in its first mode of operation so as to provide aperture size control of exposure when the frame rate is substantially constant;
    mechanism controlling means responsive to the oscillating signal for controlling the drive mechanism and the stop mechanism so that during the first sub-interval the stop mechanism releases the blade and thereafter the drive mechanism provides torque to rotate the blade, and during the second sub-interval the blade coasts until its rotation is arrested by the stop mechanism, the stop mechanism so arresting the rotation of the blade at an open shutter position;

the circuit means including a controllable switch, first and second timing networks selected by the controllable switch for timing the duration of the second sub-interval in the first and second modes respectively, the second timing network including a photoconductor for adjusting the timing of the second timing network in accordance with object light so as to provide an adjustable exposure time;

detecting circuit means connected to the servomechanism for providing an indication of whether the servomechanism has adjusted the diaphragm to maximum aperture size; and means responsive to the provided indication for automatically controlling the controllable switch.

2. The combination of claim 1 wherein the stop mechanism comprises a projection on the blade and an arrester lever pivotable between a position in a circular path of movement of the projection so as to be engageable with the projection and a position out of the circular path.

3. The combination of claim 2 further comprising a selector lever coupled to the arrester lever for adjusting the point within the circular path at which the projection and the arrester lever are engageable.

4. The combination of claim 3 wherein the mechanism controlling means includes an energizable electromagnet for attracting the arrester lever so as to pivot it.

5. The combination of claim 4 wherein the drive mechanism includes a motor having a drive coil and the mechanism controlling means includes a switch closed by the pivoting action of the arrester lever incident to energization of the electromagnet, the closing of the switch providing drive current to the drive coil.

6. The combination of claim 1 wherein the first timing network includes a manually variable resistive element.

7. The combination of claim 1 wherein the detecting means includes a transistor having a base-emitter junction that biases into and out of conduction so as to cause the transistor to switch between conductive and non-conductive conditions respectively as said indication.

* * * * *